(12) United States Patent
Muralimanohar et al.

(10) Patent No.: US 11,909,610 B2
(45) Date of Patent: Feb. 20, 2024

(54) METHOD AND SYSTEM FOR RESOURCE COUNTER TRACKING

(71) Applicant: Verizon Patent and Licensing Inc., Basking Ridge, NJ (US)

(72) Inventors: Madhan Muralimanohar, Tampa, FL (US); Muthukumar Retnasamy, Tampa, FL (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/809,654

(22) Filed: Jun. 29, 2022

(65) Prior Publication Data

US 2024/0007370 A1 Jan. 4, 2024

(51) Int. Cl.
*H04L 43/065* (2022.01)
*H04L 43/0882* (2022.01)
*H04L 43/0894* (2022.01)
*G06F 9/455* (2018.01)
*H04L 43/0817* (2022.01)

(52) U.S. Cl.
CPC ........ *H04L 43/065* (2013.01); *G06F 9/45558* (2013.01); *H04L 43/0817* (2013.01); *H04L 43/0882* (2013.01); *H04L 43/0894* (2013.01); *G06F 2009/45595* (2013.01)

(58) Field of Classification Search
None
See application file for complete search history.

(56) References Cited

U.S. PATENT DOCUMENTS 11,128,716 B1 * 9/2021 Yan .......................... H04W 4/24
11,252,246 B1 * 2/2022 Engelhart ............. H04M 15/73

* cited by examiner

*Primary Examiner* — Anh Nguyen

(57) ABSTRACT

A method, a device, and a non-transitory storage medium are described in which a resource counter tracking service is provided. The service may include the collection of resource information by a charging function from a virtualized device. The resource information may include information pertaining to hardware usage, quality of service, and transport resources associated with the virtualized device, a cluster, or a data center of relevance. The charging function may generate event information based on the resource information, and make available the event information to third party devices.

20 Claims, 6 Drawing Sheets

METHOD AND SYSTEM FOR RESOURCE COUNTER TRACKING

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
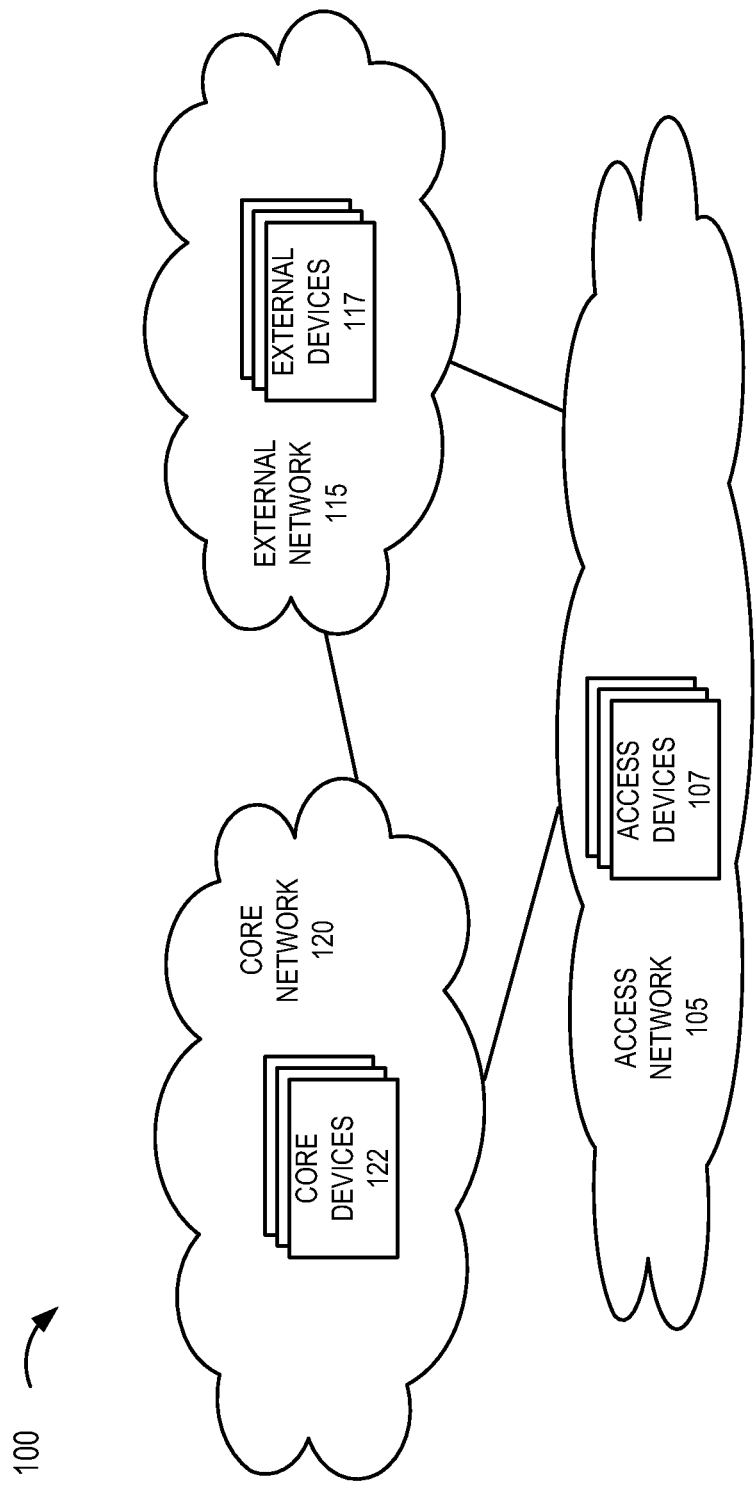
FIG. 1 is a diagram illustrating an exemplary environment in which an exemplary embodiment of a resource counter tracking service may be implemented.

The following detailed description refers to the accompanying drawings. The same reference numbers in different drawings may identify the same or similar elements. Also, the following detailed description does not limit the invention.

Container-based virtualization may allow multiple isolated user space instances to use a Kernel space within an operating system (OS). The user space instances may be referred to as a container. Typically, each container shares the same OS kernel, and keeps applications, runtimes, and various other services separated from other containers using various kernel features. A virtual machine (VM) may operate/run with its own OS, including a kernel, which may be separate from an OS of a host device. As such, the VM may execute an application/program that is not compatible with the host OS. A virtualization layer for the VM may be a hypervisor, which may reside between the VM and the underlying hardware, and a virtualization layer for the container may be a container manager. The host device may include the virtualization layer.

Various types of application layer networks, such as a cloud network, a multi-access edge computing (MEC) network, and the like may host different types of virtualized devices, such as container devices and VM devices. Additionally, for example, virtualization may be used to implement a radio access network (RAN), a core network, a backhaul network, and/or another type of network and/or network device of the network, as described herein.

Given the disparity in types of virtualized devices, a network infrastructure platform may monitor and generate separate and different resource inventory details based on the virtual environment type (e.g., VM, container, or another type). As such, there is no centralized system that may make available these resource inventory details to an external system. For example, an external system may need to communicate with each data center to obtain the resource inventory details. By way of further example, a third party device may subscribe to obtain such information based on a consumer/producer model or obtain the information according to some other type of configuration and/or arrangement.

The resource inventory details may also be limited in terms of type. For example, the resource inventory details may not include hardware usage, the number of transactions, the number of application instances, Quality of Service (QoS) metrics (e.g., network redundancy, guaranteed bit rate (GBR), latency, availability, and the like), volume of traffic (e.g., packet in/out, flows, and the like), the number of users using the infrastructure resources, and/or other types of metrics. Additionally, for example, the resource inventory details may pertain to a limited frame of reference (e.g., at a cloud network, etc.) and may not pertain to a transport resource (e.g., a RAN, a core network, transport resources within a data center, transport resources between data centers, etc.).

According to exemplary embodiments, a resource counter tracking service is described. According to an exemplary embodiment, the resource counter tracking service may monitor configurable criteria for multiple types of virtualizations. For example, the resource counter tracking service may monitor hardware usage (e.g., processor, memory, storage, communication interface, etc.) associated with VMs and containers, and other criteria, such as QoS, availability, number of transactions, number of application instances, packet in/out loads, number of users using a resource, transport resources, network redundancy, bit rate, and/or other types of network/infrastructure-based factors, as described herein. According to other examples, the resource counter tracking service may monitor the number of bits, bytes, frames, packets, segments, sessions, etc., which may be available from an Open Systems Interconnection (OSI) layer. Other types of information may be monitored and tracked, such as context information (e.g., time of day, congestion level, and/or another type of metric associated with a business rule or policy). The resource counter tracking service may monitor and generate resource information on an individual UE basis, a group of UEs basis, and/or another configurable set of UEs. According to an exemplary embodiment, the resource counter tracking service may provide resource information pertaining to one or multiple virtualized networks, virtualized devices, and/or other elements (e.g., communication links), in relation to an application layer network (e.g., MEC network, cloud network, etc.), a RAN, a core network, and/or another type of network, as described herein.

According to an exemplary embodiment, the resource counter tracking service may include a charging system. According to an exemplary embodiment, the charging system may be implemented as or include a 5G charging function (CHF). According to an exemplary embodiment, the 5G charging function may interpret and process resource information specified by a standards body, such as Third Generation Partnership Project (3GPP), 3GPP2, International Telecommunication Union (ITU), European Telecommunications Standards Institute (ETSI), GSM Association (GSMA), and the like. Additionally, according to an exemplary embodiment, the 5G charging function may interpret and process resource information, which is non-standard (e.g., relative to 3GPP and the like). According to an exemplary embodiment, the 5G charging function may provide or make available the resource information of the resource counter tracking service to an external system, as described herein.

In view of the foregoing, the resource counter tracking service may provide resource information relating to infrastructure and transport usage and other types of metrics for different types of virtualization technologies associated with virtualized devices and/or virtualized networks. The resource counter tracking service may provide a charging system that may perform a charging service based on at least some of the resource information as well as make available at least some of the resource information to an external system.

FIG. 1 is a diagram illustrating an exemplary environment 100 in which an exemplary embodiment of resource counter tracking service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Communication links may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the resource counter tracking service may use at least one of these planes of communication. Additionally, an interface of a network device may be modified (e.g., relative to an interface defined by a standards body, such as 3GPP, 3GPP2, ITU, ETSI, GSMA, and the like) or a new interface of the network device may be provided in order to support the communication (e.g., transmission and reception of messages, an information element (IE), an attribute value pair (AVP), an object, a parameter, or another form of a data instance) between network devices and the resource counter tracking service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., an Hypertext Transfer Protocol Secure (HTTPS) interface, an application programming interface (API) (e.g., a Representational State Transfer (REST) API, a Web API, or the like)), or another type of interface that may provide a secure connection.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a Fourth Generation (4G) or 4.5 RAN, etc.). Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service.

According to some exemplary embodiments, access network 105 and access devices 107 may be virtualized, in whole or in part, as described herein. According to some exemplary embodiments, access devices 107 may include logic of the resource counter tracking service, as described herein.

External network 115 may include one or multiple networks of one or multiple types and technologies that provides an application service. For example, external network 115 may be implemented using one or multiple technologies including, for example, network function virtualization (NFV), software-defined network (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, VMs, pods, network function virtualization infrastructure (NFVI), and/or other types of virtualization elements, layers, hardware resources, operating systems, engines, etc.) that may be associated with application services for use by end devices (not illustrated).

According to various exemplary embodiments, the application service may include a monolithic application, a microservice, or another type of configurable architecture. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of end device application services.

Additionally, depending on the implementation, external device 117 may include other types of network devices that may provide control and/or management services. For example, external device 117 may include an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.) and other types of network resources (e.g., communication links, etc.). External devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

According to an exemplary embodiment, external devices 117 may include a network device that obtains resource information from a charging function or similar functioning device, as described herein. For example, the network device may be implemented as a third party device that may subscribe to the resource counter tracking service. According to other examples, the resource information may be provided without a subscription. According to some examples, the third party device may be associated with a provider of an application service that may be hosted by a virtualized device (e.g., in external network 115). According to another example, the third party device may be associated with a prospective provider of an application service to be hosted by a virtualized device.

According to some exemplary embodiments, external network 115 and external devices 117 may be virtualized, in whole or in part, as described herein. According to some exemplary embodiments, external devices 117 may include logic of the resource counter tracking service, as described herein.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network exposure function (NEF), an application function (AF), a mobility management entity (MME), a packet gateway (PGW), an enhanced packet data gateway (ePDG), a serving gateway (SGW), a home subscriber server (HSS), an authentication, authorization, and accounting (AAA) server, a policy and charging rules function (PCRF), a CHF, and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.).

According to some exemplary embodiments, core network 120 and core devices 122 may be virtualized, in whole or in part, as described herein. According to some exemplary embodiments, core devices 122 may include logic of the resource counter tracking service, as described herein. According to an exemplary embodiment, core device 122, such as a CHARGING FUNCTION, may include logic that provides the resource counter tracking service, as described herein.

Figure 2A:
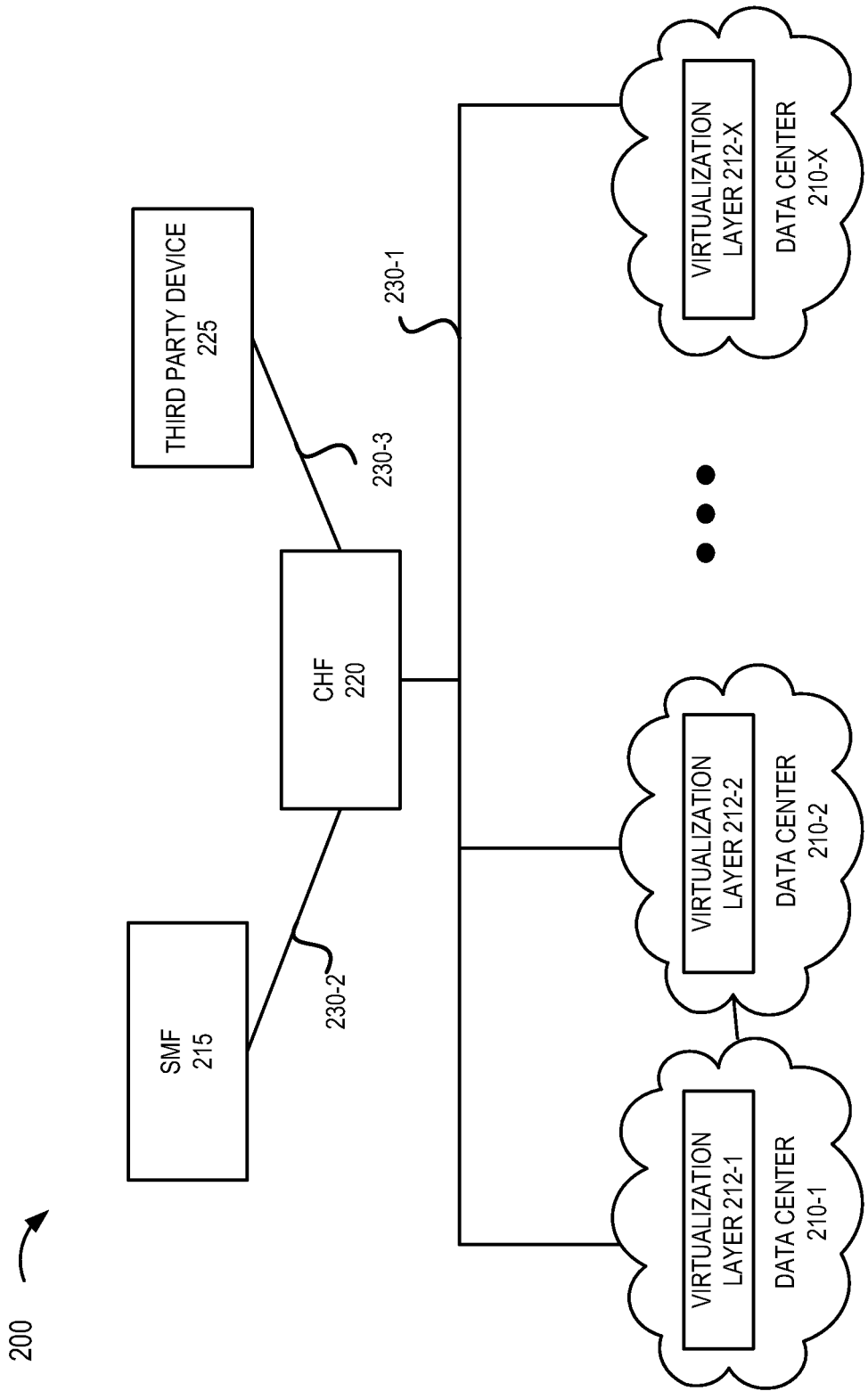
FIG. 2A is a diagram illustrating an exemplary process of an exemplary embodiment of the resource counter tracking service.

FIG. 2A is a diagram illustrating an exemplary environment 200 in which an exemplary embodiment of the resource counter tracking service may be implemented. For example, as illustrated in FIG. 2A, the environment may include data centers 210-1 through 210-X (also referred to as data centers 210, and generally or individually as data center 210), an SMF 215, a charging function 220, and a third party device 225. Data center 210 and charging function 220 may be communicatively coupled via a communication link 230-1, charging function 220 and SMF 215 may be communicatively coupled via a communication link 230-2, and charging function 220 and third party device 225 may be communicatively coupled via a communication link 230-3, as described herein. Communication link 230-1, 230-2, and 230-3 may also be referred to as communication links 230, and generally or individually as communication link 230.

Data center 210 may include a virtualized device that provides an exemplary embodiment of the resource counter tracking service. According to an exemplary embodiment, data center 210 may be implemented to include a virtualized device of external network 115. For example, data center 210 may include servers or host devices that may host an application service for end devices (not illustrated). The host devices may be implemented by one or multiple types of virtualization technologies (e.g., containers and/or VMs). According to an exemplary embodiment, data center 210 may include one or multiple access devices 107 and/or core devices 122, which may be virtualized. For example, access devices 107 and/or core devices 122 may provide connectivity between data center 210 and an end device, and/or connectivity between data centers (e.g., data centers 210-1 and 210-2). As an example, data center 210 may be implemented as a far edge site that may include a virtualized device of an application layer network (e.g., a MEC network or the like) and a virtualized device of access network 105. According to another example, data center 210 may be implemented as an edge site or a near edge site that may include similar virtualized devices and a virtualized device of core network 120. A virtualized device or a VNF may operate on the user plane, control plane, and/or another plane, as described herein.

According to an exemplary embodiment, data center 210 may include logic of the resource counter tracking service, such as a virtualization layer or element 212 associated with a virtualization technology. For example, virtualization layers 212-1 through 212-X (also referred to as virtualization layers 212, and generally or individually as virtualization layer 212) may be implemented as a control and/or management layer or element, such as a hypervisor, a container manager, or similar functioning element depending on the type of virtualization. Virtualization layer 212 may monitor configurable criteria and generate resource information, as described herein. For example, virtualization layer 212 may include monitoring hardware usage (e.g., (virtual) processor, memory, storage, buffers, communication interfaces, etc.) associated with VMs or containers, resources of a specific virtualization type (e.g., the number of containers, VMs, pods, applications or microservices), and other criteria, such as availability of application services, number of transactions, number of application/microservice instances, packet in/out loads, number of users using a resource, transport resources (e.g., communication link usage, communication links/intermediary devices within data center 210 and between host devices, communication links/devices relating a RAN, a core network, etc., service level agreement (SLA), Key Performance indicator (KPI), and/or QoS metrics (e.g., latency, bit rate (e.g., guaranteed, minimum, maximum), error rate, packet loss, reliability, throughput, and the like) and/or similar types of resources, as described herein. A host device (not illustrated) may include virtualization layer 212 and may host one or multiple VMs or containers.

SMF 215 may provide session management, Internet Protocol (IP) address allocation and management, selection, and control of user plane (UP) function, configuration of traffic steering, control of policy enforcement and QoS, among other functions. SMF 215 may communicate with charging function 220 so that online and offline charging is provided in relation to a session (e.g., a packet data unit (PDU) session), a network slice, a service data flow within a PDU session, data volumes (e.g., in relation to uplink and downlink), a DNN, and so forth. The communication may include the creation of charging, an update for the charging (e.g., when granted usage/quota has been used), and release of charging (e.g., when the session ends, the end device disconnects, etc.). Although not illustrated, SMF 215 may include a charging transfer function (CTF), which may generate charging events/information, and provide the charging events/information to charging function 220. SMF 215 may collect charging information for converged online and offline charging. The charging information may include usage of access and core network resources, usage duration in relation to a PDU session/service data flow, user information, data network address, among other types of information. SMF 215 may communicate with charging function 220 via communication link 230-2 and a service-based interface (e.g., Nchf interface) or another type of connectivity (e.g., standard interface (e.g., 3GPP, etc.), an API, etc.).

Charging function 220 may include a converged charging system (CCS) for online and offline charging. Charging function 220 may generate charging data records (CDRs), for example, based on charging event/charging information received from an SMF (e.g., SMF 215) and an AMF (not illustrated). Charging function 220 may include charging for QoS, service availability, latency, SLAs, bandwidth slice-based, location-based, data volume, throughput, reliability, API exposure, network slice, network access, and/or other type of metrics, as described herein. Although not illustrated, charging function 220 may include a charging gateway function (CGF), which may provide a mediation service that filters, validates, enriches, aggregates, and/or correlates usage data received in CDRs from the CCS. Charging function 220 may also include a rating function (RF), which may determine the rate at which credit should be reduced, and an account and balance management function (ABMF), which may track the remaining credit a user and/or an end device may have associated with an account, a subscription, or the like.

Figure 2B:
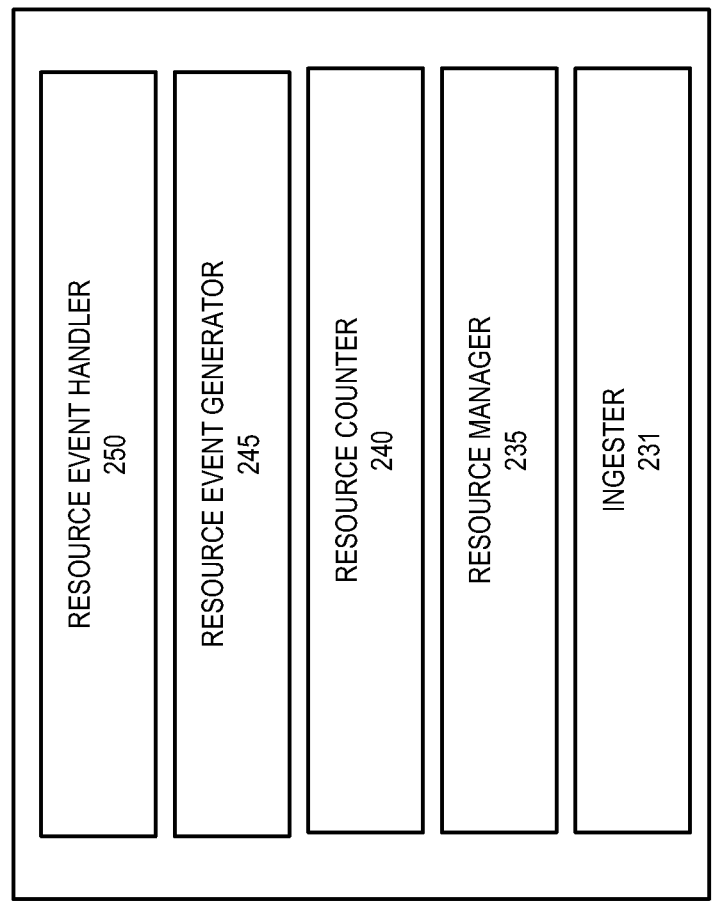
FIG. 2B is a diagram illustrating exemplary components of a charging function that provides an exemplary embodiment of the resource counter tracking service.

According to an exemplary embodiment, charging function 220 may include components that provide an exemplary embodiment of the resource counter tracking service, as further described in relation to FIG. 2B. For example, charging function 220 may obtain resource information from data center 210.

Third party device 225 may be associated with a provider of an application service that may be hosted by a virtualized device, a prospective provider of an application service to be hosted by a virtualized device, or another type of authorized party that may use the resource counter tracking service. Third party device 225 may subscribe to the resource counter tracking service. The subscription may specify various parameters relating to the resources to be tracked. The subscription may relate to a single VM or container, a host device (which may host one or multiple VMs, containers), multiple host devices (e.g., a cluster of server devices), a data center, an application service, and/or another configurable dimension or scope (e.g., data center and transport, etc.). Alternatively, third party device 225 may obtain resource or event information on-demand from charging function 220. For example, third party device 225 may include a portal, an end device (e.g., a computer, a terminal, a mobile device, or the like) and a client, a dashboard, or another type of device that may provide a graphical user interface (GUI), which may allow a user to query charging function 220 for resource/event information associated with the resource counter tracking service, as described herein.

FIG. 2A illustrates and describe an exemplary environment 200 of an exemplary embodiment of the resource counter tracking service, however according to other exemplary embodiments, the resource counter tracking service may include additional, different and/or fewer operations relative to those described.

FIG. 2B is a diagram illustrating exemplary components of a charging function that provides an exemplary embodiment of the resource counter tracking service. For example, charging function 220 may include an ingester 231, a resource manager 235, a resource counter 240, a resource event generator 245, and a resource event handler 250. According to other embodiments, charging function 220 may include additional, different, and/or fewer components than those illustrated and described herein.

Ingester 231 may include logic that ingests resource information from data center 210 via communication link 230-1. For example, ingester 231 may obtain the resource information from virtualization layer 212, as described herein. Ingester 231 may include an interface or an API, for example, which may obtain the resource information via a push or pull method. According to an exemplary embodiment, ingester 231 may obtain resource information that is non-standard (e.g., relative to 3GPP and the like), as described herein. Additionally, the resource information of data center 210 may pertain to one or multiple distinct types of virtualization technologies (e.g., only VMs, only containers, or a combination of containers and VMs). Ingester 231 may pass the resource information to resource manager 235.

Resource manager 235 may include logic that identifies a type of resource information. For example, resource manager 235 may identify resource information associated with availability versus resource usage (e.g., processor, memory, storage) associated with a VM and/or a container. According to other examples, resource manager 235 may identify resource information associated with the number of VMs, containers, and/or pods versus QoS, transport resources, or some other type or category of resource information. Resource manager 235 may pass the identified resource information Resource counter 240 may include logic that tracks each resource or metric. According to an exemplary implementation, resource counter 240 may maintain counters for each resource or metric usage according to a pre-configured unit of measure. For example, resource counter 240 may calculate processor utilization, the number of applications running in data center 210, the number of host devices, the number of active VMs, containers, and/or pods, and/or other types of resources/metrics that may be included in the resource information. Resource counter 240 may also aggregate a resource or a metric and maintain a counter on a data center scale or a portion of a data center scale. For example, resource information associated with multiple containers or VMs, or multiple host devices may be tracked and correlated to a data center identifier indicating data center 210 (e.g., as a whole) or a cluster identifier indicating a portion of data center 210. Resource counter 240 may pass resource values associated with a resource type to resource event generator 245.

Resource event generator 245 may include logic that may generate and store event information based on the resource values. For example, resource event generator 245 may compare a resource value to a threshold value to determine whether an event has occurred. According to another example, resource event generator 245 may not compare the resource value to the threshold value. For example, resource event generator 245 may generate event information based on another criterion. The event information may include the resource value and/or may include information indicative of a resource state (e.g., CPU resource depleted or exhausted, resource inactive for X period of time, etc.). The event information may also include one or multiple identifiers. For example, an identifier may identify a resource (e.g., a container, a VM, a host device, etc.) and/or an identifier may identify a data center or a portion of a data center of relevance to the event information.

Resource event handler 250 may include logic that makes available the event information. For example, resource event handler 250 may transmit the message to third party device 225. As previously described, resource event handler 250 may provide or report the message based on a subscription with third party device 225. According to another example, resource event handler 250 may alert third party device 225 based on a threshold value and a current state of a resource. According to yet another example, resource event handler 250 may support on-demand queries of the stored event information. For example, a user of third party device 225 may search or query event information of relevance via a user interface. For example, the user may obtain event information based on resource identifiers, as described herein. In either case, regardless of a push or pull method of communication, the communication may be secure and may include various security mechanisms (e.g., authentication, authorization, etc.).

Figure 3:
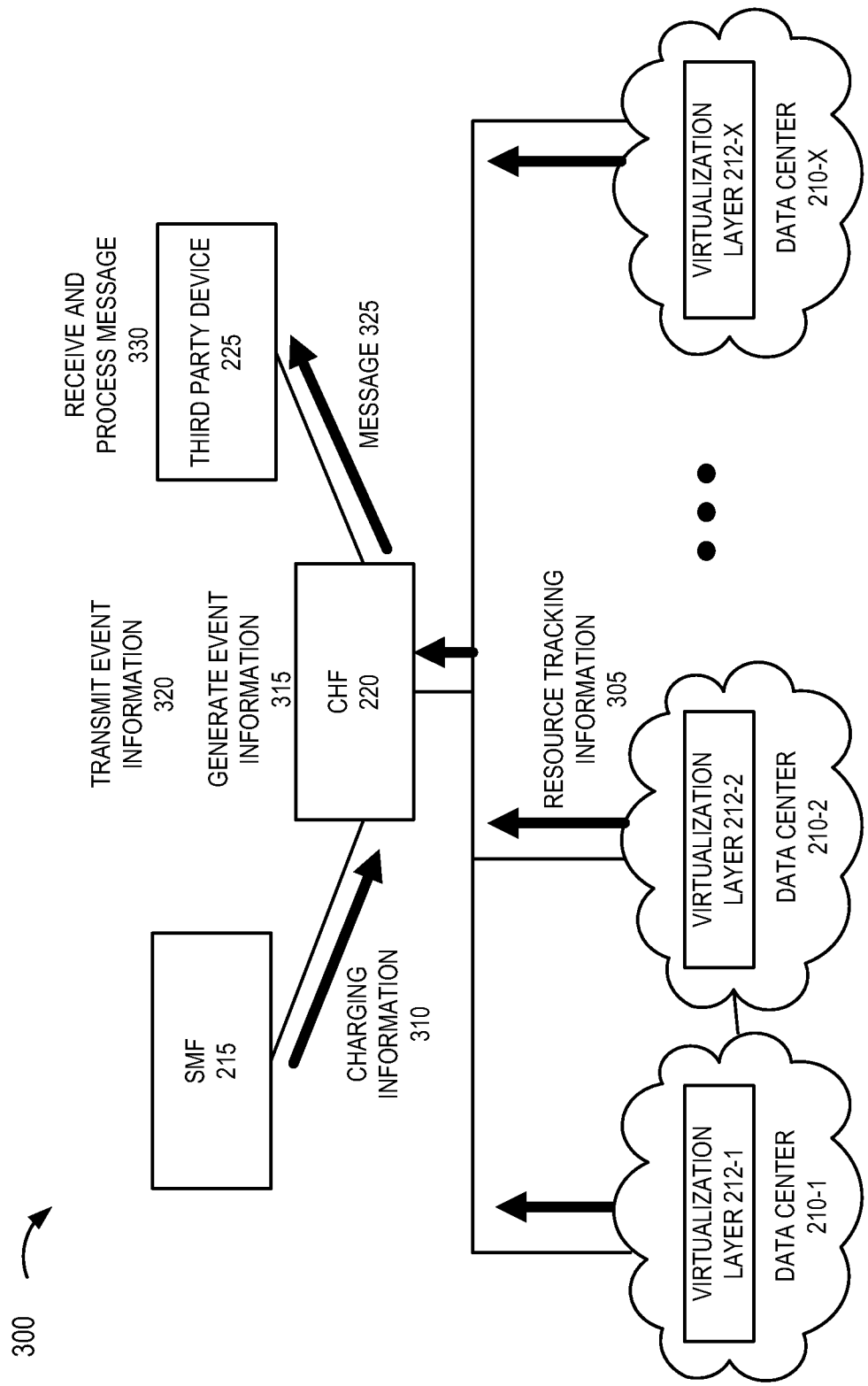
FIG. 3 is a diagram illustrating an exemplary process of an exemplary embodiment of the resource counter tracking service.

FIG. 3 is a diagram illustrating an exemplary process 300 of an exemplary embodiment of the resource counter tracking service. For purposes of description, process 300 is described in relation to data center 210-2. However, according to other exemplary scenarios, process 300 may pertain to a different data center 210 or a combination of multiple data centers 210.

As illustrated, charging function 220 may obtain 305 resource tracking information from data center 210-2. According to an exemplary embodiment, for a push or pull method, virtualization layer 212-2 of data center 210-2 may facilitate the communication. As an example, according to a VM virtualization, virtualization layer 212-2 may include a hypervisor or similar functioning element, and according to a container virtualization, virtualization layer 212-2 may include a container manager or the like.

In response to obtaining the resource tracking information, charging function 220 may generate 315 event information. For example, as described in relation to FIG. 2B, charging function 220 may generate the event information. According to this exemplary scenario, assume that charging function 220 determines to notify third party device 225. According to other exemplary scenarios, this may not be the case. For example, charging function 220 may determine to notify third party device 225 based on subscription parameters and/or based on a threshold value pertaining to a resource value. As further illustrated, charging function 220 may transmit 320 event information to third party device 225. For example, message 325 may include the event information. Third party device 225 may receive and process 330 message 325. For example, third party device 225 may include business logic that interprets the event information and may determine whether an action is to be performed. As further illustrated, SMF 215 may transmit or provide 310 charging information, as described herein, to charging function 220. Charging function 220 may process the charging information and generate CDRs.

FIG. 3 illustrates an exemplary process 300, according to other exemplary embodiments, the resource counter tracking service may perform additional operations, fewer operations, and/or different operations than those illustrated and described.

Figure 4:
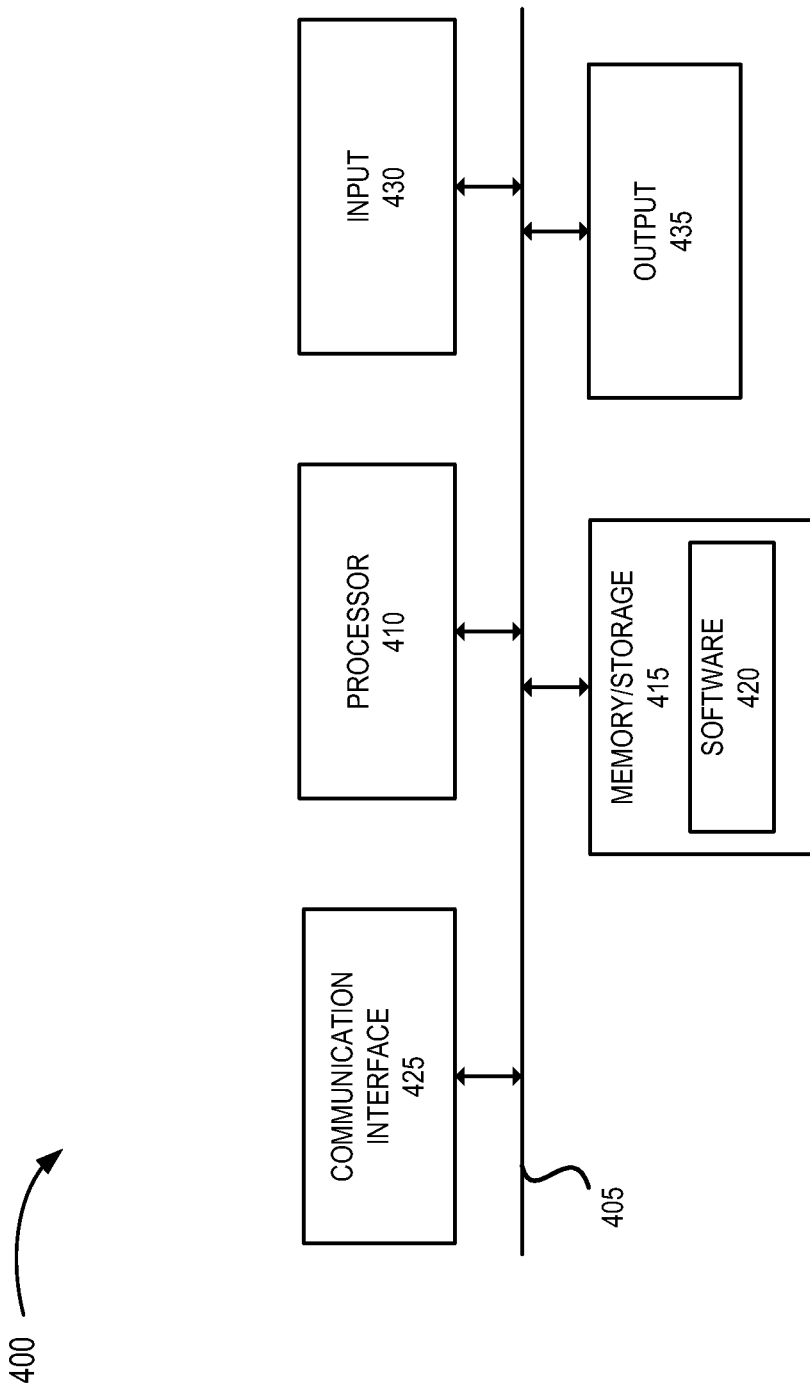
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, SMF 215, charging function 220, third party device 225, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to charging function 220, software 420 may include an application that, when executed by processor 410, provides a function and/or a process of resource counter tracking service, as described herein. Additionally, with reference to a virtualized device, software 420 may include an application that, when executed by processor 410, provides a function and/or a process of resource counter tracking service, as described herein. For example, a component of the virtualized device (e.g., a control or management layer of the virtualized device, such as a hypervisor or a container manager) may monitor and collect resource information and make available the resource information to a charging function (e.g., CHF 220). Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
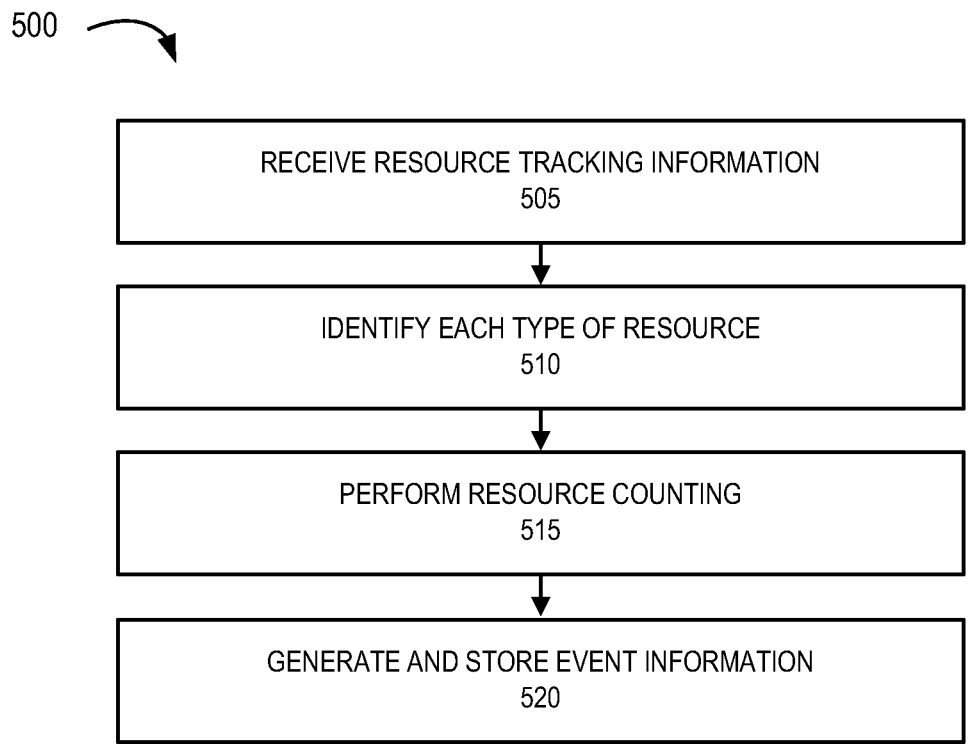
FIG. 5 is a flow diagram illustrating yet another exemplary process of an exemplary embodiment of the resource counter tracking service.

FIG. 5 is a flow diagram illustrating an exemplary process 500 of an exemplary embodiment of the resource counter tracking service. According to an exemplary embodiment, charging function 220, a similar functioning network device, or a component of charging function 220, as described herein, may perform a step of process 500. According to an exemplary implementation, processor 410 executes software 420 to perform the step of process 500, as described herein. For the sake of simplicity, process 500 will be described in relation to a charging function 220.

In block 505, charging function 220 may receive resource information. For example, charging function 220 may receive the resource information from a virtualization layer of a virtualized device, as described herein. By way of further example, the resource information may pertain to a data center, as described herein.

In block 510, charging function 220 may identify each type of resource included in the resource information. For example, charging function 220 may identify a category of resource, such as a hardware type (e.g., processor, etc.), QoS, and/or another type of resource (e.g., usage, transport, etc.), as described herein.

In block 515, charging function 220 may perform resource counting for each resource type. For example, may maintain counters for each resource or metric usage according to a pre-configured unit of measure. For example, resource counter 240 may calculate resource values for each type of resource, as described herein. Resource counter 240 may also aggregate a resource or a metric and maintain a counter on a data center scale, a portion of a data center scale, and/or another configured scope (e.g., data center and external transport resources, etc.).

In block 520, charging function 220 may generate and store event information based on the resource counting. For example, charging function 220 may compare a resource value to a threshold value to determine whether an event has occurred. According to other examples, this may not be the case, and charging function 220 may generate and store the event information to indicate a current state, for example. The event information may include the resource value and/or may include information indicative of a resource state, as described herein. The event information may include one or multiple resource identifiers (e.g., data center ID, cluster ID, VM ID, application service ID, host device ID, etc.) of relevance to the resource value. According to some exemplary embodiments, charging function 220 may generate a charging data record pertaining to the resource value, which may be included in the event information.

FIG. 5 illustrates an exemplary embodiment of a process of the resource counter tracking service, according to other exemplary embodiments, the resource counter tracking service may perform additional operations, fewer operations, and/or different operations than those illustrated and described. For example, charging function 220 may transmit an event message to third party device 225 based on a subscription and/or reporting procedure. According to another example, third party device 225 may obtain event information of interest from charging function 220 via a user interface, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a Fifth Generation (5G) charging function of a core network from a virtualized device, resource information pertaining to the virtualized device, wherein the resource information includes hardware usage, which includes a processor, a memory, a storage, and a communication interface usage of the virtualized device, and at least one quality of service metric pertaining to the virtualized device including at least one of latency or application availability;
   generating, by the 5G charging function, a resource value for each resource of the resource information;
   generating, by the 5G charging function, event information for each resource value; and
   storing, by the 5G charging function, the event information.

2. The method of claim 1, wherein the resource information is received from a container manager or a hypervisor of the virtualized device that is subject to being charged.

3. The method of claim 1, wherein the virtualized device is a radio access network device, a core network device, or a device of an application layer network that hosts an end device application service or a microservice.

4. The method of claim 1, further comprising:
   transmitting, by the 5G charging function, the event information to a third party device of a third party associated with the virtualized device.

5. The method of claim 1, wherein the resource information indicates a number of active containers or a number of active virtual machines, and a corresponding application service or microservice.

6. The method of claim 1, wherein the resource information includes transport resource information pertaining to resources that communicatively couples the virtualized device to one or more other virtualized devices or an end device.

7. The method of claim 1, wherein the event information includes data indicating a state of each resource and one or multiple resource identifiers.

8. The method of claim 1, wherein the at least one quality of service metric further includes a bit rate or an error rate.

9. A network device comprising:
   a processor configured to:
      receive from a virtualized device, resource information pertaining to the virtualized device, wherein the resource information includes hardware usage, which includes a processor, a memory, a storage, and a communication interface usage of the virtualized device, and at least one quality of service metric pertaining to the virtualized device including at least one of latency or application availability, wherein the network device is a Fifth Generation (5G) charging function of a core network;
      generate a resource value for each resource of the resource information;
      generate event information for each resource value; and
      store the event information.

10. The network device of claim 9, wherein the resource information is received from a container manager or a hypervisor of the virtualized device that is subject to being charged.

11. The network device of claim 9, wherein the virtualized device is a radio access network device, a core network device, or a device of an application layer network that hosts an end device application service or a microservice.

12. The network device of claim 9, wherein the processor is further configured to:
   transmit the event information to a third party device of a third party associated with the virtualized device.

13. The network device of claim 9, wherein the resource information indicates a number of active containers or a number of active virtual machines, and a corresponding application service or microservice.

14. The network device of claim 9, wherein the resource information includes transport resource information pertaining to resources that communicatively couples the virtualized device to one or more other virtualized devices or an end device.

15. The network device of claim 9, wherein the event information includes data indicating a state of each resource and one or multiple resource identifiers.

16. The network device of claim 9, wherein the at least one quality of service metric further includes a bit rate or an error rate.

17. A non-transitory computer-readable storage medium storing instructions executable by a processor of a Fifth Generation (5G) charging function of a core network, wherein the instructions are configured to:
   receive from a virtualized device, resource information pertaining to the virtualized device, wherein the resource information includes hardware usage, which includes a processor, a memory, a storage, and a communication interface usage of the virtualized device, and at least one quality of service metric pertaining to the virtualized device including at least one of latency or application availability;
   generate a resource value for each resource of the resource information;
   generate event information for each resource value; and
   store the event information.

18. The non-transitory computer-readable storage medium of claim 17, wherein the resource information is received from a container manager or a hypervisor of the virtualized device that is subject to being charged.

19. The non-transitory computer-readable storage medium of claim 17, wherein the virtualized device is a radio access network device, a core network device, or a device of an application layer network that hosts an end device application service or a microservice.

20. The non-transitory computer-readable storage medium of claim 17, wherein the instructions are further configured to:
   transmit the event information to a third party device of a third party associated with the virtualized device.

* * * * *